(12) United States Patent
Schnitter et al.

(10) Patent No.: US 7,419,926 B2
(45) Date of Patent: Sep. 2, 2008

(54) SINTERED BODIES BASED ON NIOBIUM SUBOXIDE

(75) Inventors: Christoph Schnitter, Holle (DE); Gerhard Wötting, Coburg (DE)

(73) Assignee: H.C. Starck GmbH (DE)

( * ) Notice: Subject to any disclaimer, the term of this patent is extended or adjusted under 35 U.S.C. 154(b) by 436 days.

(21) Appl. No.: 10/962,791

(22) Filed: Oct. 12, 2004

(65) Prior Publication Data

US 2005/0103638 A1    May 19, 2005

(30) Foreign Application Priority Data

Oct. 14, 2003   (DE)  ................. 103 47 702

(51) Int. Cl.
  *C04B 35/495*  (2006.01)
  *C04B 35/053*  (2006.01)
  *H01G 9/042*   (2006.01)

(52) U.S. Cl. .................. 501/134; 501/108; 361/528

(58) Field of Classification Search ................. 501/134, 501/108; 361/528
  See application file for complete search history.

(56) References Cited

U.S. PATENT DOCUMENTS 6,136,062 A * 10/2000 Loffelholz et al. ............ 75/369
6,322,912 B1   11/2001 Fife ............................ 428/702
6,387,150 B1 *  5/2002 Naito .......................... 75/245
6,391,275 B1    5/2002 Fife ............................ 423/592
6,416,730 B1    7/2002 Fife ............................ 429/592
6,462,934 B2   10/2002 Kimmel et al. ............. 361/508
6,527,937 B2    3/2003 Fife ............................ 205/209
6,576,099 B2    6/2003 Kimmel et al. ............. 204/291
6,592,740 B2    7/2003 Fife ............................ 205/149
6,762,927 B2    7/2004 Schnitter et al. ............ 361/508
2003/0003044 A1  1/2003 Fife ............................ 423/592
2003/0026756 A1  2/2003 Kimmel et al. ............. 423/592
2003/0104923 A1 * 6/2003 Omori et al. ................ 501/134
2003/0170169 A1 * 9/2003 Omori et al. ............. 423/592.1
2004/0033183 A1  2/2004 Fife ............................. 423/62
2005/0013765 A1 * 1/2005 Thomas et al. .......... 423/592.1
2005/0018384 A1  1/2005 Schnitter .................... 361/523
2005/0019581 A1  1/2005 Schnitter ................... 428/411.1

FOREIGN PATENT DOCUMENTS

WO    00/15555    3/2000
WO    00/67936   11/2000

* cited by examiner

*Primary Examiner*—Karl E Group
(74) *Attorney, Agent, or Firm*—Connolly Bove Lodge & Hutz LLP

(57) ABSTRACT

Disclosed are sintered bodies that include: (a) 30 to 100 mol % of $NbO_x$, wherein $0.5<x<1.5$; and (b) 0 to 70 mol % of MgO. The sintered bodies may be used as inert apparatuses in the production of niobium suboxide powder or niobium suboxide anodes, or as chemically resistant components in chemical apparatuses.

8 Claims, No Drawings

SINTERED BODIES BASED ON NIOBIUM SUBOXIDE

CROSS REFERENCE TO RELATED PATENT APPLICATION

The present patent application claims the right of priority under 35 U.S.C. §119 (a)-(d) of German Patent Application No. 103 47 702.0, filed Oct. 14, 2003.

FIELD OF THE INVENTION

The present invention relates to a sintered body based on niobium suboxide. In particular, the present invention relates to sintered shaped bodies which, on account of their resistance to chemicals, are used in chemical apparatus and preferably for the production of anodes for solid electrolyte capacitors, in particular sintered anodes made from niobium suboxide.

BACKGROUND OF THE INVENTION

Anodes of this type are produced by sintering fine niobium suboxide particles to form a sponge-like structure with an extremely large surface area. A dielectric niobium pentoxide layer is produced on this surface by electrolytic oxidation, and the capacitor cathode, which may consist of manganese dioxide or a polymer electrolyte, is produced on the pentoxide layer. The process used to produce anodes or capacitors of this type, as well as the production of the capacitor precursor powders, includes a range of mechanical and thermal treatment steps in vacuo or reactive and/or protective gas, which entail the risk of contamination with elements which have an adverse effect on the capacitor properties. Therefore, according to WO 02/086923 A2, it is proposed that all equipment used for the mechanical or thermal treatment involved in the production of anodes consist of niobium metal or at least be coated with niobium metal.

One drawback in this context is that niobium metal is a so-called oxygen getter material, which tends to take up oxygen at high temperatures. Accordingly, during high-temperature treatment steps involved in the production of niobium suboxide anodes, which may involve temperatures of up to 1600° C., there is a high risk of oxygen being withdrawn from the niobium suboxide in an uncontrolled way, in particular if there is direct contact between the niobium suboxide and the niobium metal at this high temperature. Furthermore, the niobium metal becomes increasingly brittle as a result of the uptake of oxygen when used repeatedly, and therefore typically has a short service life.

SUMMARY OF THE INVENTION

According to the invention, it is now proposed that devices which are used in the production of anodes of this type be formed as sintered bodies based on niobium suboxide and if appropriate magnesium oxide.

Examples of devices of this type include vessels, reactor vessels, reactor linings, mill linings, milling beads, milling rollers, press moulds, press rams, etc.

In accordance with the present invention, there is provided a sintered body comprising:
 (a) 30 to 100 mol % of $NbO_x$,
  wherein x is greater than 0.5 and less than 1.5 (i.e., $0.5<x<1.5$); and
 (b) 0 to 70 mol % of MgO, the mole percents being based in each case on the total moles of $NbO_x$ and MgO.

The invention also provides a method for producing solid electrolyte capacitors comprising a niobium suboxide anode, said method comprising:
 pre-treating a pre-cursor of said niobium suboxide anode by a treatment means selected from the group consisting of mechanical treatment, thermal treatment and combinations thereof,
 wherein said pre-treatment is performed in an apparatus comprising at least one sintered body according to the present invention upon which said pre-cursor of said niobium suboxide anode is placed.

In a further embodiment of the above method, said method further comprises the steps of
 providing a sinter plate comprising said sintered body according to the present invention,
 placing said pre-cursor of said niobium suboxide anode on said sinter plate,
 pre-treating said precursor of said niobium suboxide.

In general, said pre-cursor of a niobium suboxide anode is produced by pressing.

The sintered bodies according to the present invention are particularly suitable for use in chemical apparatuses, thus the present invention also provides a chemical apparatus comprising chemically resistant components fabricated from the sintered body according to the present invention.

Such a chemical apparatus is particularly suitable for the production of capacitor grade niobium suboxide powder.

Unless otherwise indicated, all numbers or expressions, such as those expressing quantities of ingredients, mole and volume percents, process conditions, etc., used in the specification and claims are understood as modified in all instances by the term "about."

DETAILED DESCRIPTION OF THE INVENTION

The sintered bodies preferably contain niobium suboxide of the formula $NbO_x$, where $0.7<x<1.3$.

It is particularly preferable for the sum of the molar percentages of niobium suboxide and magnesium oxide to be 100% with the exception of inevitable foreign element impurities. In particular, the sintered bodies should be substantially free of iron, chromium, nickel, alkali metals and halogens. The iron, nickel, chromium, sodium, potassium, chlorine and fluorine impurities should particularly preferably each amount to less than 10 ppm, particularly preferably less than 5 ppm, and also preferably in total less than 30 ppm. On the other hand, impurities or alloying elements of vanadium, tantalum, molybdenum and tungsten amounting to up to a few mol %, for example up to 5 mol %, are harmless.

The sintered bodies according to the invention may advantageously consist of 35 to 100 Mol % of $NbO_x$ and 65 to 0 Mol % of MgO. The sintered bodies according to the invention preferably consist of 30 to 60 Mol % of $NbO_x$ and 70 to 40 Mol % of MgO, particularly preferably of 45 to 60 Mol % of $NbO_x$ and 55 to 40 Mol % of MgO.

Preferred sintered bodies according to the invention have porosities of less than 30% by volume, more specifically the sintered bodies according to the invention have porosities of from greater than 0% by volume to less than 30%, particularly preferably less than 20% by volume, more specifically the sintered bodies according to the invention have porosities of from about 1% by volume to less than 15% by volume. The percent volumes being based on the total volume of the sintered body.

The sintered bodies containing magnesium oxide in accordance with the invention preferably comprise microstructures which include substantially homogeneous niobium suboxide-rich regions and magnesium oxide-rich regions which each extend at most 1.5 μm, preferably at most 1.0 μm in at least one direction. It is preferable for the niobium suboxide-rich regions to comprise at least 95%, particularly preferably at least 99%, of niobium suboxide. The magnesium oxide-rich regions preferably comprise up to 99% of magnesium oxide.

The sintered bodies according to the invention can be produced using standard ceramic processes. For example, the shaping can be performed by axial and/or isostatic pressing, extrusion, conventional pressure-free or pressurized slip casting or also by injection moulding. Depending on the process used, suitable organic auxiliaries, such as for example PVA, PEG, etc. (for pressing), wax or plasticizers which are commercially available for this purpose (for the injection moulding, etc.), which after moulding can be expelled (binder removal) without leaving any residues by means of a heat treatment in air, under protective gas or in vacuo without altering the basic properties of the inorganic base powder, are added to the powder in a manner which is known per se from sintering technology. In air, a temperature of 250° C., preferably 150° C., should not be exceeded, in order to prevent oxidation of the niobium suboxide.

In the case of shaping by pressing, the addition of the organic auxiliaries may advantageously be combined with a granulation step in order to improve the flow properties of the powder.

In the case of slip casting, preliminary drying, preferably in air, has to be carried out after demoulding and prior to the binder removal. Furthermore, a (careful) mechanical treatment using chip-forming processes, such as turning, milling, drilling, etc., can be carried out after the shaping step and prior to the binder removal, in order to make the bodies as close as possible to the desired net shape of the sintered body. A treatment of this type may also be carried out after the binder removal and any pre-sintering step for consolidating the shaped body, in which case machining processes such as dry or wet grinding may also be used.

The sintering itself is carried out in gastight furnaces under a protective gas atmosphere, such as argon or gas mixtures based on argon together with typically 3 to 10% by volume of hydrogen or the like in order to counteract a change in the oxidation state of the niobium suboxide. Before the sintering begins, the furnace is purged with the protective gas or evacuated and flooded with the protective gas. To avoid direct contact between the shaped body to be sintered and the furnace lining, the shaped body is mounted on supports/spacers ("firing aids") made from materials which are thermally and chemically stable at the sintering temperature and do not enter into any reaction with the suboxide. Sintering aids made from dense or porous silicon carbide have proven particularly suitable. The sintering preferably takes place at temperatures of less than 1700° C., particularly preferably between 1550 and 1650° C., with a slow heating rate of less than 10 K/min to the sintering temperature, preferably 1 to 3 K/min in the upper temperature range from 1100° C. up to the sintering temperature, with a holding time at the sintering temperature of preferably less than 10 hours, depending on the desired densification of the shaped body and the particle size of the niobium suboxide and optionally magnesium oxide powders used.

The starting material used for the production of the sintered bodies according to the invention is preferably commercially available high-purity niobium pentoxide with a specific surface area of from 5 to 20 $m^2$/g. The niobium pentoxide, either as such or after reduction in flowing hydrogen to form the niobium dioxide, can be reduced to the suboxide by means of magnesium vapour at a temperature of from 950 to 1150° C. This forms an agglomerate powder which contains magnesium oxide inclusions.

This powder can be used as such after milling to produce the sintered bodies according to the invention. If the starting point is niobium dioxide, sintered bodies which contain approximately 50 Mol % of MgO are obtained. On the other hand, if the starting point is niobium pentoxide, sintered bodies which contain approximately 67 Mol % of magnesium oxide are obtained.

The starting point for the production of sintered bodies which do not contain any magnesium oxide is preferably likewise fine-particle niobium pentoxide with a high specific surface area. This niobium pentoxide is reduced in flowing hydrogen at a temperature of from 1100 to 1400° C. to form the niobium dioxide. Some of the niobium dioxide is reduced further in magnesium vapour to form the niobium metal. Then, the magnesium oxide which is formed is washed out of the niobium metal by means of acids, for example sulphuric acid. The niobium metal is then heated with a stoichiometric quantity of niobium dioxide in a hydrogen-containing atmosphere to 1100 to 1600° C., leading to conversion to the niobium suboxide, NbO. Other compositions of the sintering powder in accordance with the invention are obtained by correspondingly varying the quantitative ratios of the respective reaction components or mixtures.

To attain the relatively high densities of the sintered bodies, it is preferable to use fine-particle agglomerate powders, particularly preferably a screened fraction below 38 μm, more preferably below 20 μm.

Furthermore, the powders which can be used in accordance with the invention to produce the sintered bodies, are eminently suitable for producing coatings by means of high-temperature or plasma spraying, in which case it is possible to produce surface layers which are similar to sintered structures on metals such as niobium, tantalum, molybdenum and/or tungsten. In this case, it is if appropriate possible to additionally use niobium metal powder in subordinate quantities of up to 20% by weight, preferably between 10 and 18% by weight, as binder. Coated devices of this type made from niobium, tantalum, molybdenum or tungsten, according to the invention, are also suitable for the production of solid electrolyte capacitors based on niobium suboxide. Metal devices of this type provided with a coating which is similar to a sintered structure are also intended to be encompassed by the term "sintered body" in accordance with the invention.

PRODUCTION EXAMPLE

The production of a sintering plate for solid electrolyte capacitor anodes is explained below by way of example for the sintered bodies according to the invention.

A niobium suboxide powder of composition NbO with a particle size of less than 38 μm and a particle size distribution in accordance with ASTM B822 (Malvern Mastersizer) corresponding to a D10 value of 2.8 μm, a D50 value of 11.4 μm and a D90 value of 25.2 μm is used. The flow properties of the powder are improved by screening granulation and a tumbling treatment without further additives sufficiently for uniform filling of a press mould to be possible. A hard metal press mould with a square aperture with a side length of 125 mm is used. The granulated powder is introduced into the mould and compacted at 2 kN/$cm^2$. The pressed body, with dimensions of approximately 125×125×15 $mm^3$, after demoulding, is welded into a plastic film and compressed further isostatically at 200 Mpa. The result is a pressed body of approx. 122×122× 13 mm³. This pressed body is machined on a conventional milling machine in such a way that a dish-like part with an encircling rim with a height of 13 mm and a wall thickness of 5 mm for both the base and the rim remains.

The green machined part is placed without further pretreatment, inside a SiC vessel, into a gastight furnace heated by means of graphite resistance heating and is sintered. At the start of the sintering, the furnace is evacuated and flooded with a gas mixture comprising 97% by volume of argon and 3% by volume of hydrogen. The heating programme follows a heat-up rate of 10 K/min up to 500° C., a heat-up rate of 5 K/min up to 1100° C., then a heat-up rate of 2.5 K/min up to 1600° C., a holding time of 3 hours at 1600° C., a controlled cooling rate of 5 K/min down to 800° C., followed by uncontrolled cooling to below 150° C. The shaped part which is then removed from the furnace has a density of 6.9 g/cm³ and a Vickers-Hardness HV 10 of 14 Gpa. It may optionally be remachined on the inside and/or outside in order to establish predetermined geometry and surface structures.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims. The priority document and all further documents cited herein are incorporated by reference for all useful purposes.

What is claimed is:

1. A sintered body comprising: (a) 30 to 100 mol % of $NbO_x$, wherein $0.5<x<1.5$; and (b) 0 to 70 mol % of MgO wherein said sintered body has a porosity of from greater than 0% by volume to less than 30% by volume.

2. The sintered body of claim 1 comprising: (a) 35 to 100 Mol % of $NbO_x$; and (b) 65 to 0 Mol % of MgO.

3. The sintered body of claim 1 comprising: (a) 45 to 60 Mol % of $NbO_x$; and (b) 55 to 40 Mol % of MgO.

4. The sintered body of claim 1 wherein $0.7<x<1.3$.

5. The sintered body of claim 1 wherein said porosity is from about 1% by volume to less than 15% by volume.

6. The sintered body of claim 1 wherein said sintered body has a microstructure comprising homogeneous, $NbO_x$-rich regions and MgO-rich regions, which each extend at most 1.5 µm in at least one direction.

7. The sintered body of claim 1 wherein said sintered body is a sintering plate for solid electrolyte capacitor anodes.

8. A chemical apparatus comprising chemically resistant components fabricated from the sintered body of claim 1.

* * * * *